Nov. 4, 1958 W. F. KINNUCAN 2,858,871
TRACTION DEVICE
Filed Feb. 5, 1954 2 Sheets-Sheet 1
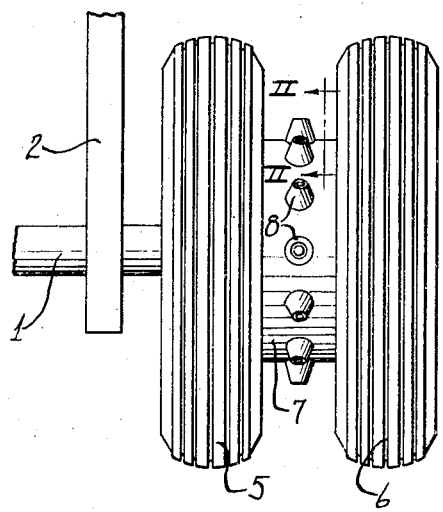
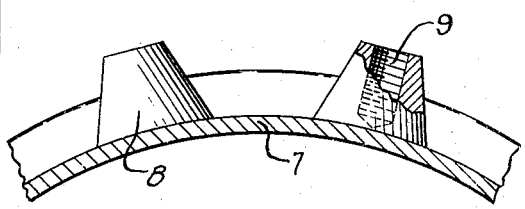
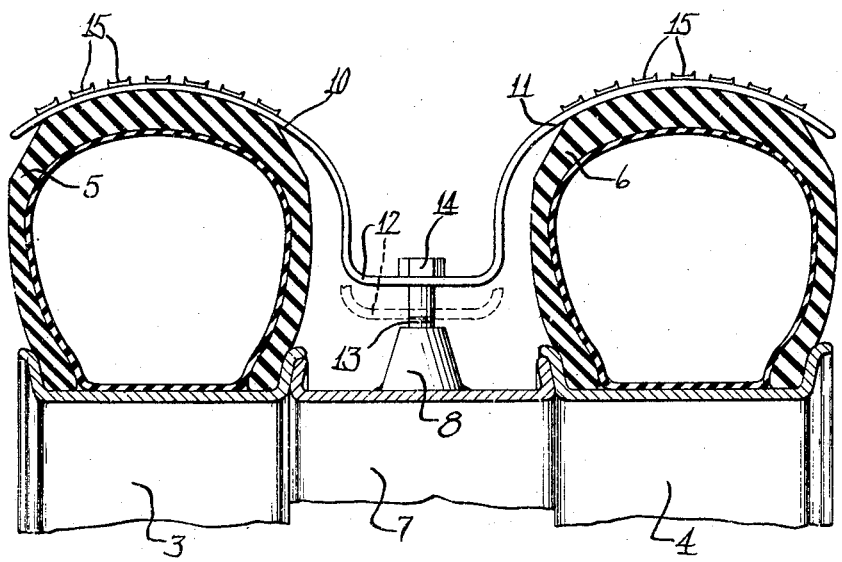
Inventor
Walter F. Kinnucan Nov. 4, 1958 W. F. KINNUCAN 2,858,871
TRACTION DEVICE
Filed Feb. 5, 1954 2 Sheets-Sheet 2
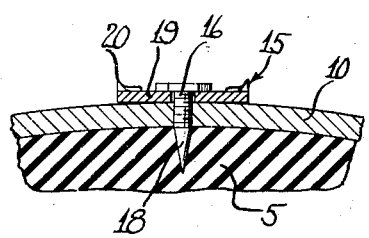
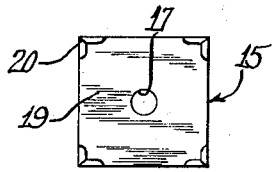
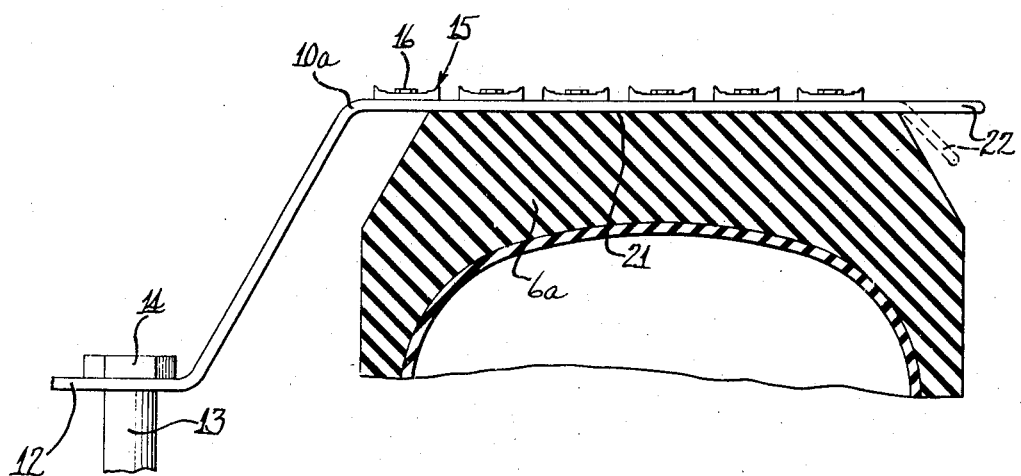
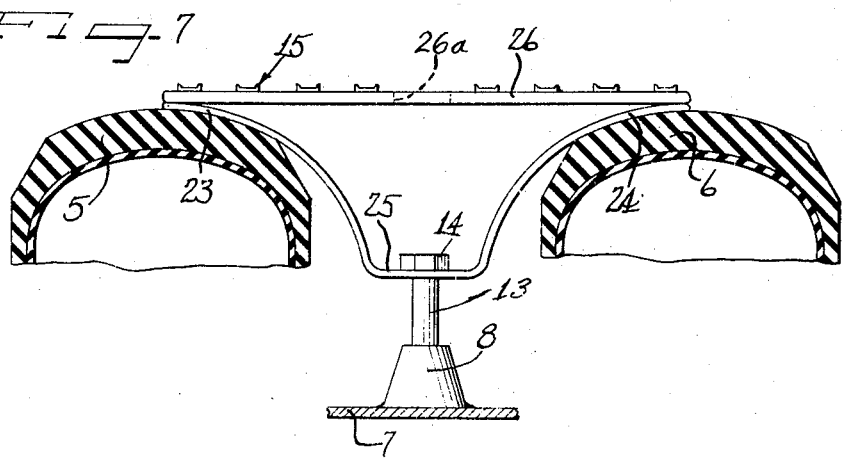
Inventor
Walter F. Kinnucan United States Patent Office 2,858,871
Patented Nov. 4, 1958

2,858,871

TRACTION DEVICE

Walter F. Kinnucan, Chicago, Ill.

Application February 5, 1954, Serial No. 408,344

4 Claims. (Cl. 152—220)

This invention relates to improvements in a traction device, and more particularly to traction means highly desirable for attachment to vehicle wheels to obtain desired or necessary traction, the invention being very suitable for use in connection with trucks, tractors, trailers, semi-trailers, and particularly with twin-tire wheel assemblies, although the invention will have other uses and purposes as will be apparent to one skilled in the art.

In the past, many and various types of traction or anti-skid devices for attachment to the wheels of vehicles, particularly motor vehicles, have been developed, but have proven unsatisfactory for many reasons. It is significant to note that these reasons do not always apply to inferior construction or defectiveness in the devices, but a device may prove most unsatisfactory even though it would provide adequate traction, but is overly difficult to mount on the wheels. It has been the almost universal practice to utilize chains as traction or non-skid devices particularly on vehicles of the type of trucks or tractors and trailers or semi-trailers, which vehicles most frequently utilize twin-tire wheel assemblies. In order to apply chains, it is necessary to jack up the vehicle until a wheel assembly is clear of the ground. Most frequently a driver must pull a tractor and trailer or tractor and trailer train off the highway onto soft ground in order to put on chains, and in some mountainous regions, it is even impossible to pull off the road. It is extremely difficult to jack up a loaded trailer, particularly on a slope, and it is extremely difficult to do so in soft ground or mud. In any event, it is most frequently necessary for the driver to actually get down on the road or in the mud on his stomach in order to effect proper application of the chains, and the chains are extremely heavy to manipulate. It is well known that many drivers will take unnecessary and dangerous risks, rather than go through the extreme and aggravating effort of applying chains to the wheels, particularly in cold and stormy weather. Even though dangerous road conditions are apparently imminent, many drivers will pass through a more or less dangerous situation before attempting to apply chains, and then it may be too late.

Traffic accidents and costly delays frequently result by virtue of inadequate traction, caused principally by snow, sleet, ice, wetness, mud, and the like. Sudden temperature changes, of which a driver may be totally unaware, frequently produce dangerous road conditions, and oft times a driver will attempt to overcome such conditions by a light or "feathering" application of the brakes which, especially on down grades, causes the air pressure to reach a perilously low degree. But, notwithstanding the fact that a cautious and skillful driver may have taken the time and accomplished the irksome expedient of putting on chains, jackknifing of the tractor and trailer, a pile-up, a ditching, or some other accident may result because chains as heretofore constructed will not overcome sidewise or forward skidding under certain road conditions. This is mainly because chains cannot be applied so that the cross links will be, in effect, an integral part of the tire.

With the foregoing in mind, it is an important object of the instant invention to provide a traction device or traction means that may be easily and simply applied to a vehicle wheel without the necessity of jacking up that wheel.

Another object of the invention resides in the provision of a traction device or traction means for vehicle wheels which may be applied simply and easily and in such a manner that the portion of the device which overlies the tire tread, in effect, becomes a component or integral part of the tire.

A further feature of the invention resides in the provision of a traction device or traction means which are so constructed that, when applied to a tire, both forward and lateral skidding are effectively prevented.

Another feature of the invention resides in the provision of traction means for application to vehicle wheels, which means are so constructed that they are equally effective to provide adequate traction at all times, regardless of the weight of the load on the vehicle.

Another and important object of the instant invention is the provision of traction means embodying tread overlying portions, and which means are readily and easily attachable to a part of the wheel assembly other than the tire from a standing position, and by the use of tools normally carried.

Still another important object of the invention is the provision of traction means for vehicle wheels, which may be applied in a simple and easy manner and in individual sections, so that the driver need only apply as many as deemed necessary for a particular purpose, if he so desired, or he may apply sufficient elements to properly encircle the tire for steady driving.

Also a feature of the invention is the provision of traction means for application to vehicle wheels, which embody means for overlying the tread of a tire, while the attachment is directly connected to some other portion of the vehicle wheel, the construction being such that the tread engaging portion is clamped tightly to the tire and yet is floatingly mounted relatively to the securement or attaching means, so that the tread engaging portion may move relatively to the attaching means and consequently follow the normal compression and expansion of a tire during running.

It is also an object of the invention to provide traction means particularly suitable for application to a twin-tire wheel assembly, the means having portions overlying the treads of the adjacent tires, and the means being readily attachable to the spacer band area of the wheel assembly between the tires.

A further object of the invention resides in the provision of traction means for a twin-tire wheel assembly, which include a spacer band having an annular series of anchoring elements thereon, and traction elements designed to transversely overlie the treads of the adjacent tires, but which are anchored between the tires to the elements on the spacer band.

Still another object of the invention resides in the provision of traction means for a vehicle wheel, which means embody an arm to transversely overlie a tire tread, calk-like means being carried on the external surface of the arm, and pointed elements project inwardly from the arm directly into the tire tread.

It is a still further feature of the invention to provide traction means for vehicle tires, which embody an arm-like element for extending transversely across the tread of a tire, and which arm-like element is provided with a series of removable and replaceable calks.

While some of the more salient features, characteristics and advantages of the instant invention have been above pointed out, others will become apparent from the following disclosures, taken in conjunction with the accompanying drawings, in which—

Figure 1 is a fragmentary rear elevational view of a twin-tire wheel assembly including a spacer band embodying principles of the instant invention;

Figure 2 is an enlarged fragmentary transverse sectional view taken substantially as indicated by the line II—II of Fig. 1, looking in the direction of the arrows, and with parts broken away;

Figure 3 is an enlarged transverse vertical sectional view through the upper portion of the wheel assembly of Fig. 1 with traction means embodying principles of the instant invention operatively connected to the spacer band;

Figure 4 is a greatly enlarged fragmentary vertical sectional view through a portion of the structure of Fig. 3, illustrating the application of the calks utilized in the instant invention;

Figure 5 is a top plan view of one of the calks removed;

Figure 6 is an enlarged fragmentary vertical sectional view, of the same general character as Fig. 3, but illustrating a somewhat different form of the instant invention; and Figure 7 is a view similar in character to Fig. 6, but illustrating a still different form of the invention.

As shown on the drawings:

While the instant invention may in some cases be applied to a wheel assembly of the character embodying a single tire, for purposes of clarity it is herein illustrated and described in connection with a twin-tire wheel assembly of the character commonly used on trucks, tractors, semi-trailers, trailers, and the like. Since the wheel assembly itself is of standard and known construction, only sufficient of it is herein illustrated to afford a proper presentation of the instant invention itself.

With reference to Figs. 1, 2 and 3, the wheel assembly is mounted on an axle 1 associated with a frame structure rather diagrammatically indicated at 2. The wheel assembly includes a pair of rims 3 and 4 upon each of which is a pneumatic tire 5 and 6, respectively. Between the rims, in order to keep the tires properly spaced, is a spacer ring 7, annularly flanged as usual for engagement with the rims 3 and 4.

In the instance of the present invention, the spacer ring 7 is preferably cast and is provided with an annular series of projecting bosses 8 which function as anchoring elements for the traction members to be later described. These bosses are preferably cast integrally with the ring, although if so desired the ring could be formed of sheet steel, and the bosses welded thereto. As seen in Fig. 2, each of the bosses 8 is provided with an internal threaded aperture 9. Any desired number of the bosses may be provided, and for the usual heavy duty tractors and trailers, twelve to fourteen bosses per spacer band is a satisfactory number, although in some instances, a lesser number could be used.

A traction device may readily be engaged with each anchoring element or boss 8. As seen in Fig. 3, a preferred form of such traction device comprises a single piece member including laterally extending arms 10 and 11 connected at their inner ends by a reentrant U-shaped yoke portion 12. The arms 10 and 11 extend transversely over the treads of the tires 5 and 6, while the yoke portion 12 extends inwardly between the tires. This yoke portion is provided with an aperture through which a bolt 13 may freely extend and become threadedly engaged with one of the bosses 8. The head 14 of that bolt bears against the external face of the yoke portion 12, and is preferably of the same size as the stud nuts which hold on the wheel, so that the same tool may be used to remove and replace the traction device.

The traction device may be very simply mounted on the wheel, without any need to jack up the truck or trailer until the wheel clears the ground. The device may be put on while the operator is in a standing position, since it is simply necessary to place the device with the arms 10 and 11 over the tread of the tires, slip the bolt 13 through the opening in the yoke portion 12, and engage the bolt tightly in one of the bosses 8. The bolt is preferably tightened down so that the arms 10 and 11 firmly engage the respective tire treads to such an extent that they will, in effect, become an integral part of the tire. As illustrated in Fig. 3, the yoke portion 12 floats on the bolt 13 so that when the tire is in contact with the road, and therefore compresses, the yoke portion may slide down the bolt to the dotted line position seen in this figure, and as that part of the tire leaves the road, and the tire correspondingly swells, the yoke portion will move outwardly into contact with the bolt head. Thus, it will be seen that the traction element stays in firm contact with the tire tread at all times and there is no movement of the element relatively to the tire.

The traction device is preferably constructed from a strip of flat tensile spring steel metal, and may satisfactorily be 2 to 2½" in width. Mounted on the outer surface of each of the arms 10 and 11 is one or more rows of calks or the like 15. These are preferably removably mounted, as seen more particularly in Fig. 4. For each calk, there is a threaded aperture in the respective arm 10 or 11, and in that aperture a headed bolt 16 is engaged, the bolt passing through a suitable aperture 17 in the respective calk 15. Preferably, the inner end of the bolt beyond the threaded portion thereof is in the form of an elongated sharp point or spike 18 and this point enters and is embedded in the tire tread, when the traction device is clamped over the tires. This also prevents any lateral movement or any movement of the traction device relatively to the respective tire.

The calks 15 may be made of any desirable shape, but are preferably polygonal and each includes a base portion 19 with outstanding prongs or projections 20 at the corners. These projections obviously provide firm road gripping elements and effectively prevent either lateral or forward skidding. Should a calk become worn or broken, it is a simple expedient to remove the damaged one, and replace it with a new one, an extra supply of calks taking up very little space, and an extra supply may easily be carried in the truck or trailer along with the traction devices.

The traction devices herein set forth obviously would require no more room to carry than chains or other traction devices heretofore known. When it is desired to mount them on the wheel, it is a simple expedient for the driver to successively secure each device in position by the simple manipulation of a bolt 13. In this operation, the driver need not resort to endeavoring to jack up a heavily loaded vehicle, nor need he soil his clothing in the operation. When placing the traction lugs on one or more wheels, the driver may put as many on as can comfortably be done, and then move the vehicle sufficiently to rotate more bosses 8 into position for easy mounting of the traction device. Further, the driver may put on as many devices as he may think necessary for the intended purpose. Obviously, if he intends to drive reasonably long distances with the devices in position, a device should be connected to each boss on a wheel, but in some instances the driver may be temporarily stuck in mud or loose earth, and to effect sufficient traction to again resume travel, only a few of the devices may be necessary, and they may be easily removed after the vehicle is again on firm ground.

Obviously, the use of the instant invention with the devices functioning as an integral part of the tires will eliminate many accidents, effectively prevent skidding, jack-knifing, and provide ample traction for pulling up grade over icy road surfaces. The simplicity of operation of the traction devices affords no driver any excuse for not taking adequate precautions at all times.

In Fig. 6 I have illustrated a slightly different form of the invention, which is particularly desirable for tires having flat tread surfaces. In this instance, the general structure of the traction device is the same as that previously described, but it will be noted that the device is equipped with arm portions such as 10a, which extend straight outwardly rather than with the curvature as seen in the structure of Fig. 3. Thus the arm comes into direct contact and firm contact with a flat tread 21 on a tire 6a. In this instance also each arm of the device is preferably made of a bendable metal, at the ends, so that the outer end portion 22 of the arm may be hammered down around the shoulder of the tire as indicated by dotted lines, if so desired, in logging, etc. This expedient eliminates injurious scuffing of the tire, and may be utilized when necessary, depending upon road conditions. Otherwise, the structure of Fig. 6 functions the same as that previously described.

In Fig. 7 I have illustrated a still different form of construction whereby the device may be utilized to provide traction between the tires for the trailers, single or plural. In this instance, the traction device includes a pair of opposed arms 23 and 24 connected at their inner ends by a reentrant yoke portion 25 apertured for floating engagement with an elongated bolt 13 provided with the same head 14. The arms 23 and 24 preferably extend half way or a little more over each tire tread to eliminate side sway due to wind pressure. Welded or equivalently secured to the end portions of the arms 23 and 24 is a transverse bar 26 which preferably is substantially straight, and this bar carries on its external surface calks 15 of the character above described. The bolt 13 passes through the yoke 25 freely and is tightly engaged in the boss 8 to firmly and positively clamp the traction device against the tire treads. The bar 26 is provided with an aperture 26a to afford access to the bolt head 14 for a socket wrench or the like. In this construction, however, the bolts holding the calks to the bar 26 do not penetrate the tire treads. The device seen in Fig. 7 also moves in and out relatively to the bolt 13 in keeping with the compression and expansion of the tires, so as to diminish the possibility of breakage of the traction device.

From the foregoing, it is apparent that I have provided traction means for vehicle wheels which are simple to mount, simple to remove, highly effective in operation, and in which injury to an individual element does not adversely affect the operation of any of the other elements. Consequently, if one element becomes broken or damaged to such an extent as to operate inefficiently, the journey may be continued with full reliance upon the remaining elements, or the injured element may readily be replaced, as desired. The traction means are highly durable, the only parts receiving extreme wear being the calks 15, which are easily and economically replaced when necessary. An entire set of traction elements for a wheel are as economical as any traction means heretofore known, occupy little space, and are very easily handled. Consequently, the traction means are extremely economical, and they are obviously highly durable.

It will be understood that modifications and variations may be effected without departing from the scope of the novel concepts of the present invention.

I claim as my invention:

1. Traction means for a double-tire wheel assembly, including a spacer band maintaining a pair of tire wheels in properly spaced relation, said spacer band having an annular series of anchoring elements permanently secured thereon, resilient traction members to transversely overlie the treads of the adjacent tires, a yoke part on each traction member to extend inwardly between the adjacent tires in spaced relation thereto, and means to floatingly connect said yoke part to one of said anchoring elements.

2. Traction means for a double-tire wheel assembly, including a spacer band maintaining a pair of tire wheels in properly spaced relation, said spacer band having an annular series of anchoring elements permanently secured thereon, traction members to transversely overlie the treads of the adjacent tires, a yoke part on each traction member to extend inwardly between the adjacent tires in spaced relation thereto, and an externally headed member extending through said yoke part for engagement with one of said anchoring elements, said member having a smooth shank for free sliding movement of said yoke part.

3. Traction means for a double-tire wheel assembly, including a spacer band maintaining a pair of tire wheels in properly spaced relation, said spacer band having an annular series of anchoring elements permanently secured thereon, resilient traction members to transversely overlie the treads of the adjacent tires, a yoke part on each traction member to extend inwardly between the adjacent tires in spaced relation thereto, and an externally headed member extending through said yoke part for engagement with one of said anchoring elements, said yoke part floating on said member to move relatively thereto as the tires flatten and expand during travel.

4. In a traction device for a twin-tire wheel assembly, a spacer band maintaining a pair of tire wheels in properly spaced relation, said spacer band having threaded openings evenly spaced therearound, elongated smooth shanked bolts engageable in said openings, a plurality of resilient traction elements each comprising spaced arms connected by a depressed yoke portion apertured for sliding engagement with one of said bolts, said yoke portion and said spacer band being relatively sized for the yoke portion to extend freely between the tires on said wheels in spaced relation thereto whereby each traction element is floatingly mounted on a bolt.

References Cited in the file of this patent

UNITED STATES PATENTS

| | | |
|---|---|---|
| 167,239 | Guilford | Aug. 31, 1875 |
| 1,115,636 | Wielobob | Nov. 3, 1914 |
| 1,115,692 | Lauffer | Nov. 3, 1914 |
| 1,237,398 | Sjobring | Aug. 21, 1917 |
| 1,609,464 | Compton | Dec. 7, 1926 |
| 2,095,095 | Howard | Oct. 5, 1937 |
| 2,310,467 | Schwab | Feb. 9, 1943 |
| 2,312,486 | Riesen | Mar. 2, 1943 |
| 2,458,522 | MacKay | Jan. 11, 1948 |
| 2,473,249 | Hershman | June 14, 1949 |
| 2,530,108 | Whichard | Nov. 14, 1950 |
| 2,557,241 | Silver | June 19, 1951 |
| 2,624,388 | Kane | Jan. 6, 1953 |
| 2,652,091 | Kane | Sept. 15, 1953 |
| 2,685,903 | Lutey | Aug. 10, 1954 |
| 2,696,238 | Jarvis | Dec. 7, 1954 |
| 2,719,559 | Smith | Oct. 4, 1955 |